Figure 1:
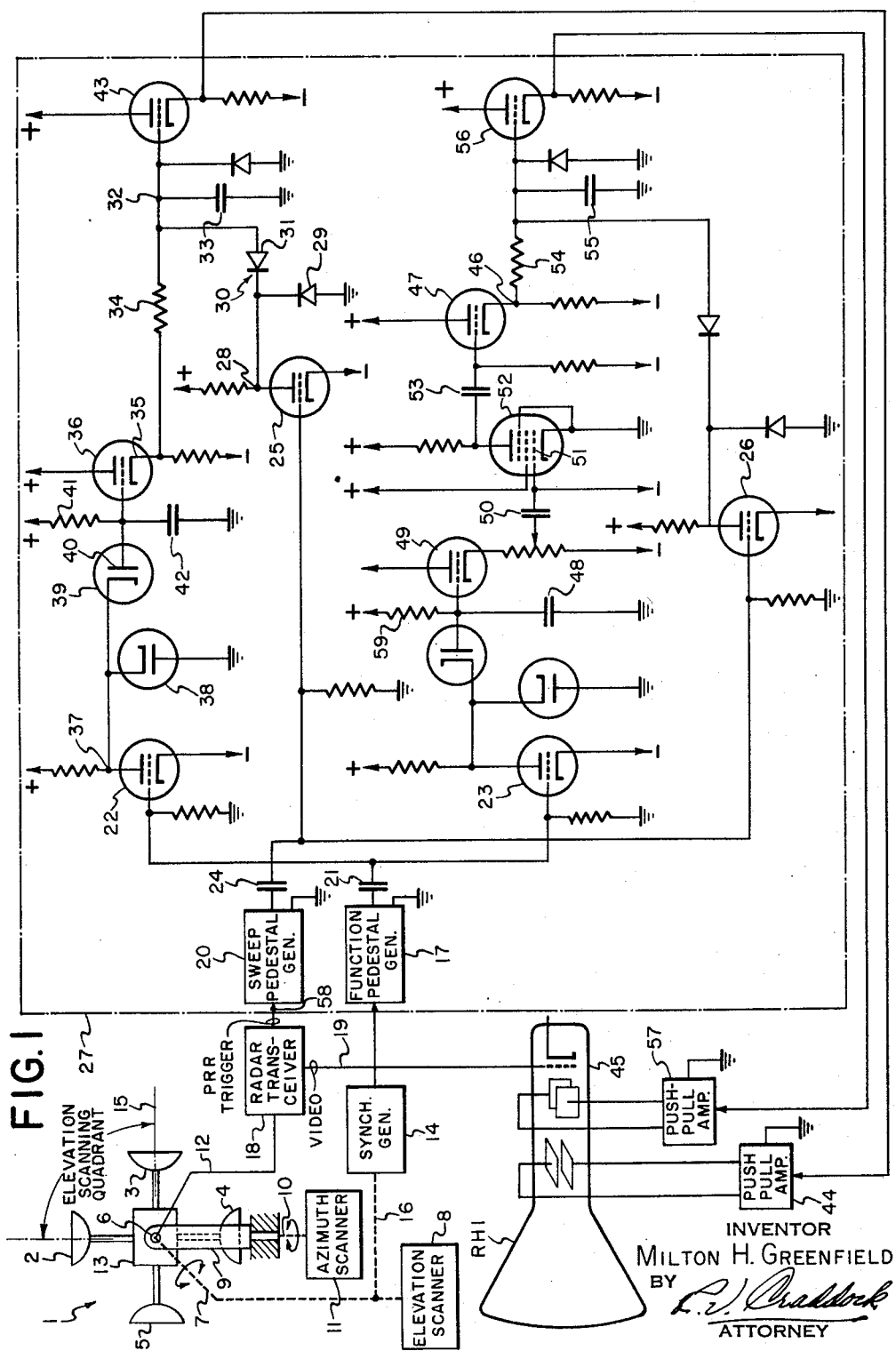

July 19, 1960 M. H. GREENFIELD 2,946,048
SWEEP GENERATOR FOR QUADRANT-SCANNING RADAR
Filed Nov. 17, 1958 2 Sheets-Sheet 1

INVENTOR
MILTON H. GREENFIELD
BY
ATTORNEY

United States Patent Office 2,946,048
Patented July 19, 1960

2,946,048
SWEEP GENERATOR FOR QUADRANT-SCANNING RADAR

Milton H. Greenfield, Bronx, N.Y., assignor to Sperry Rand Corporation, a corporation of Delaware Filed Nov. 17, 1958, Ser. No. 774,242

6 Claims. (Cl. 343—5)

The present invention generally relates to the generation of deflection signals for radar target indicators and, more particularly, to an electronic sweep generator for use in a radar having a beam scannable through only a quadrant.

Quadrant-scanning radars are known in the art for the detection of targets lying within a predetermined angular sector. For example, in the case of target height finding radar, the angular sector through which the radar beam is scanned lies between the zenith and the horizon. In such height finding radars, provision is made for rapidly scanning through the same elevation quadrant in rapid succession. Accordingly, target indicator deflection means are required for the deflection of the indicator electron beam through the same elevation quadrant in synchronism with the scanning of the radar antenna.

One of the well known deflection techniques contemplates the use of an electro-mechanical resolver whose rotor is mechanically connected to rotate in synchronism with the elevational movement of the radar antenna. Particularly in applications where rapid scanning of the antenna is involved, however, the resolver and interconnecting mechanical linkages are subjected to a substantial amount of mechanical wear which lessens reliability.

It is the principal object of the present invention to overcome the limitations of prior art mechanical deflection apparatus by the provision of an electronic sweep generator for use in a quadrant-scanning radar.

Another object is to provide sweep generation means for the production of a pair of sweep signals proportional to the values of the sine and cosine of the scanning angle of a radar antenna as the antenna is successively swept through the same angular quadrant.

A further object of the present invention is to provide electronic means for the generation of an amplitude modulated pair of sawtooth deflection signals, the modulated envelopes being respectively conformable to a sine and cosine function in a predetermined quadrant.

These and other objects of the present invention as will appear more fully upon a reading of the following specification in conjunction with the appended drawings are accomplished by the provision of an electronic sweep generator adapted to operate in synchronism with the angular displacement of a quadrant-scanning radar antenna. The sweep generator is adapted to receive pulse repetition rate triggers from the radar and scanning angle synchronization triggers, the latter of which initiate the operation of a pair of function generators which individually amplitude modulate a repetitive sequence of sawtooth signals.

In a preferred embodiment of the invention in which the radar beam is caused to scan repetitively through the same quadrant in elevation, one of the function generators produces a signal conformable to the value of a sine function of angles intervening zero and 90°. The other function generator is operable to produce a signal proportional to the values of the cosine of the same angular increment. Each of the signals produced by the function generators contains a leading edge occurring at the time that a given one of four radar antennas is oriented along a predetermined reference line, for example, the horizon. Each of said signals further contains a terminal edge occurring at the time that the same antenna has finished a quadrant traversal as measured from the reference line. That is, the function generator signals persist for a time during which one of the four radar antennas is caused to scan through a complete elevation quadrant starting from the horizon and ending at the zenith.

The aforementioned four radar antennas are mounted at 90° with respect to each other around the circumference of a circle. Additionally, each of the four radar antennas is energized sequentially solely during the time of its traversal through the predetermined quadrant. The period of energization of each of the antennas begins when the antenna is directed along the horizon and terminates when the same antenna has assumed a position along the zenith. When the zenith position is assumed by one of the antennas, the antenna which next follows in the direction of elevation scanning becomes energized. In this manner, as the four radar antennas continuously rotate in the elevation plane, the same quadrant in elevation is scanned in rapid succession.

In order that target height and range data be obtained throughout the predetermined elevation quadrant the radar repetition interval is made substantially less than the quadrant scanning interval. Additionally, the radar pulse repetition rate is non-coherent with the quadrant scanning repetition rate so that the loss of target data at discrete elevation angles is substantially eliminated.

The electronic sweep generator essentially comprises two separate channels, each containing an R-C integrating circuit. The two channels are similar to each other in structure and operation with the exception that in one of the channels the integrator is energized by a signal representing a single quadrant sine function while the integrator of the other channel is energized by a signal representing the same quadrant cosine function. The capacitors of the integrating circuits in both channels are simultaneously discharged by shunt gating circuits which are operated at the radar pulse repetition rate.

In this manner, two output signals are produced by the electronic sweep generator, each consisting of an amplitude modulated sequence of sawtooth waves, one being modulated in accordance with a sine function and the other being modulated in accordance with a cosine function. The two output signals are applied to respective push-pull deflection amplifiers for the orthogonal deflection of a cathode ray tube indicator such as a range-height indicator.

Figure 2:
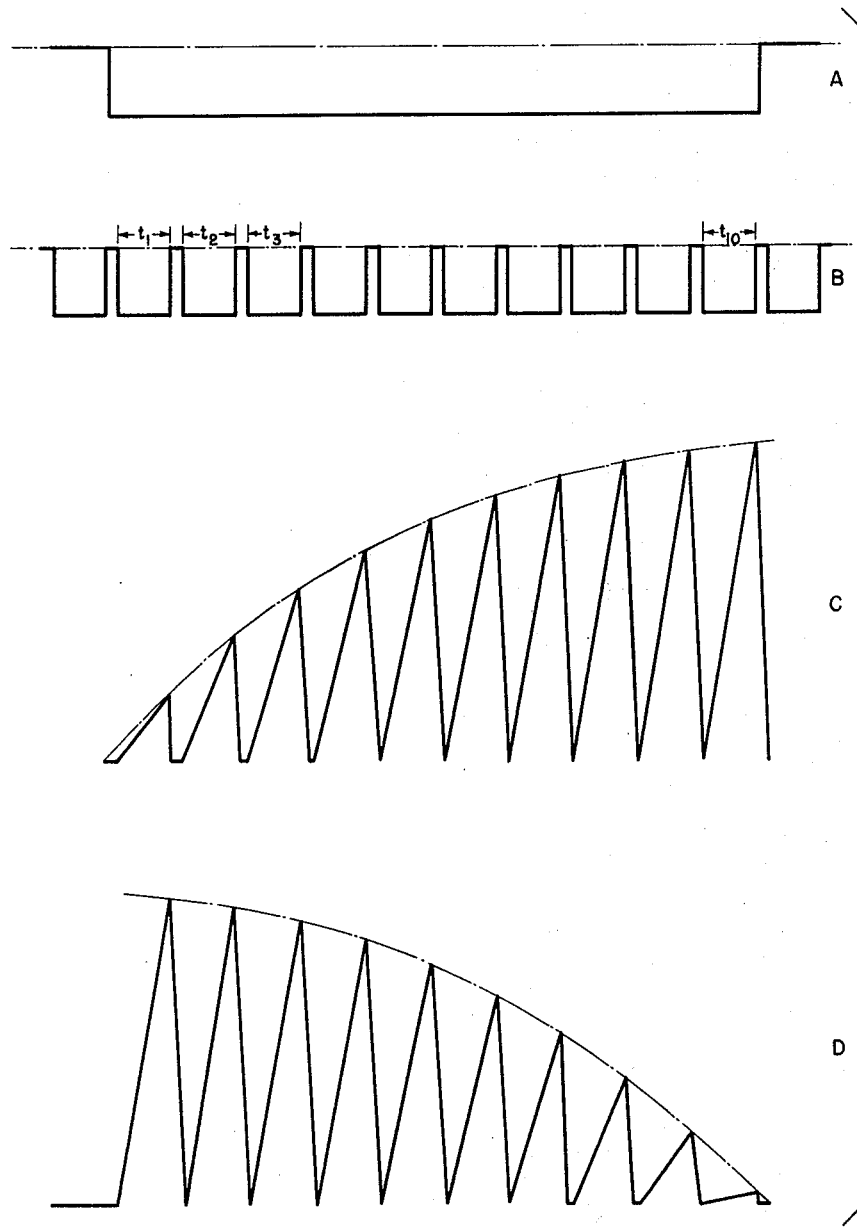

For a more complete understanding of the present invention, reference should be had to the following specification and to the drawings of which:

Fig. 1 is a block diagram, partially schematic in form, of a preferred embodiment of the present invention; and Fig. 2 is a series of waveforms useful in explaining the operation of the apparatus indicated in Fig. 1.

In Fig. 1, a composite radiator of microwave energy is generally represented by the numeral 1. The composite radiator includes four antennas 2, 3, 4, and 5 which are mounted at right angles with respect to each other and which are adapted to be rotated together in elevation about a horizontal axis 6. The elevational rotation is imparted to antenna 1 by shaft 7 driven by elevation scanner 8. Shaft 7 is suitably supported for rotation as by means of yoke 9 which may be rotated in azimuth by shaft 10 driven by azimuth scanner 11.

Each of the antennas 2, 3, 4, and 5 are successively energized at the radar pulse repetition rate by means of a microwave transmission line 12. A rotary microwave switch (not shown) is included within the structure 13 of composite antenna 1 and operates to sequentially energize each of the antennas 2, 3, 4, and 5 during the time that each assumes a position within the elevation scanning quadrant designated in the drawing.

For example, in the indicated position of composite antenna 1, component antenna 2 has just completed traversal of the elevation scanning quadrant while the beam of component antenna 3 is about to enter said quadrant, assuming the indicated counterclockwise direction of rotation. During the next succeeding time interval, solely component antenna 3 will be energized until antenna 3 assumes the position indicated for component antenna 2. Composite antenna 1 and its rotary microwave switch may assume the form of any of similar prior art devices such as, for example, the antenna and switching arrangement disclosed in U.S. Patent 2,484,822 issued on October 18, 1949 in the name of Robert V. Gould and assigned to the present assignee.

Composite antenna 1 differs from that specifically illustrated in the aforementioned patent only to the extent that antenna 1 comprises four component antennas quadrantly mounted while three component antennas, mounted at 120° with respect to each other, are shown in the patent. However, the teaching of the patent is readily extendible to any number of composite antennas such as the configuration of composite antenna 1.

For purposes of monitoring the entrances of each of the component antenna beams into the designated elevation scanning quadrant, synchronous generator 14 is provided to produce a single trigger pulse each time that the beam of one of the continuously rotating composite antennas assumes a position along the horizon line 15. Generator 14, which may consist of a conventional microswitch signal generator, receives a mechanical input signal via linkage 16 connected to shaft 7 and is driven by elevation scanner 8.

The electrical trigger signal output of generator 14 activates function pedestal generator 17 which may be a conventional monostable mutlivibrator. Generator 17 produces an output rectangular pulse in response to triggers derived from generator 14, said pulse having a leading edge concurrent with the triggers and a trailing edge occurring a predetermined time thereafter. The predetermined time is substantially equal to the quadrant scanning interval during which one of the composite antennas 2, 3, 4, and 5 traverses the elevation scanning quadrant.

Radar transceiver 18, whose microwave transmission line 12 is connected to composite antenna 1, produces pulse repetition rate triggers on line 58 and target video signals on line 19. The pulse repetition rate triggers activate sweep pedestal generator 20 which may be similar in structure and operation to generator 17. The rectangular pulse output from generator 20 differs from that of generator 17 to the extent that the leading edge thereof is non-coherent with that of the output pulse of generator 17. Additionally, the duration of the pulse output of generator 20, which is slightly less than the radar pulse repetition interval, is substantially shorter than the quadrant repetition interval duration of the output pulse of generator 17.

The output of generator 17 is coupled via capacitor 21 to the grids of triode amplifiers 22 and 23. The output of generator 20 is coupled by capacitor 24 to the grids of amplifiers 25 and 26. Triodes 22 and 25 comprise the inputs to the sine channel of electronic sweep generator 27. Similarly, triodes 23 and 26 form the inputs to the cosine channel of sweep generator 27.

With respect to the sine channel, triode 25 is quiescently biased to full conduction whereby the potential at plate terminal 28 tends to fall below ground. The full conduction plate potential is maintained at ground, however, by the clamping action of diode 29 which is rendered conductive in such instance. The conduction of diode 29 also renders conductive diode 30 whose anode terminal 31 is connected to terminal 32 of capacitor 33. Upon the simultaneous conduction of diodes 29 and 30, capacitor 33 is effectively shorted precluding the establishment of any charge thereon.

Upon the appearance of a negative rectangular output pulse from generator 20, triode 25 is cut off, in turn raising its plate potential and redereing diodes 29 and 30 non-conductive. Upon the non-conduction of diodes 29 and 30 capacitor 33 is permitted to charge through resistor 34 to the potential then appearing at the cathode 35 of cathode follower 36. As a consequence of the short duration of the pulse produced by generator 20 and the relatively long R–C time constant of resistor 34 and capacitor 33, a lineally increasing positive potential appears across the terminals of capacitor 33. The slope and peak amplitude of the potential across capacitor 33 is a function of the amplitude of the signal appearing at cathode 35 of cathode follower 36.

Triode 22, like triode 25, is also quiescently biased for full conduction which tends to depress the anode potential at point 37 to a value below ground. The anode potential is prevented from falling below ground by the clamping action of diode 38. Upon the conduction of diode 38, diode 39 is also rendered conductive inasmuch as its anode 40 is connected by resistor 41 to a source of positive potential.

Triode 22 is cut off by the negative rectangular output pulse of generator 17. The cut-off positive potential at plate terminal 37 of triode 22 simultaneously renders diodes 38 and 39 non-conductive thus freeing capacitor 42 to charge toward the fixed positive potential which is applied across resistor 41 and capacitor 42. As previously mentioned, the duration of the negative output pulse of generator 17 is substantially greater than the duration of the output pulse of generator 20, the former being equal to the quadrant scanning interval and the latter being slightly less than the radar pulse repetition interval. Therefore, capacitor 42 is permitted to charge for a substantially greater length of time than capacitor 33 is allowed to charge. Additionally, the R-C time constant of resistor 41 and capacitor 42 is so chosen that an exponentially increasing voltage appears across capacitor 42 during its charging cycle. This is in contrast to the lineally increasing potential appearing across capacitor 33 during its respective charging interval. The exponentially increasing waveform appearing across capacitor 42 further appears at the cathode 35 of cathode follower 36.

The manner in which capacitor 33 successively charges in response to the output pulse of generators 17 and 20 may be better understood by reference to Fig. 2. In Fig. 2, the negative rectangular output pulse of generator 17 is represented by waveform A. The succession of negative output pulses produced by generator 20 during the time interval occupied by waveform A is represented by waveform B. For purposes of illustration, ten pulses of waveform B are generated during the interval of waveform A. This relationship corresponds to ten successive energizations of radar transceiver 18 during the interval wherein one of the composite antennas 2, 3, 4, and 5 is traversing the elevation scanning quadrant from the horizon to the zenith. It will be noted that because of the non-coherent relationship between the output pulses of generators 17 and 20, the leading edge of waveform A is not necessarily coincident with the leading edge of the first of the negative pulses of waveform B.

Capacitor 33 of Fig. 1 is permitted to charge to the potential appearing at cathode 35 of cathode follower 36 during the time intervals $t_1$, $t_2$, $t_3$ ... $t_{10}$. The lineally rising voltages successively appearing across capacitor 33 are shown in waveform C of Fig. 2. As previously stated, the slope and peak amplitude of each of the succession of sawtooths generated across capacitor 33 is determined by the potential produced at cathode 35 of cathode follower 36. It will be recalled that an exponentially increasing voltage is generated at cathode 35 during the interval occupied by the negative portion of waveform A.

Although only ten negative pulses of waveform B occur during the negative portion of waveform A for purposes of illustration, in a practical case a much larger ratio obtains. Assuming, for example, that 100 negative pulses of waveform B occur during the negative interval of waveform A, the potential of cathode 35 of cathode follower 36 may be considered substantially constant during each of the successive charging cycles of capacitor 33. The exponentially increasing voltage at cathode 35 is utilized in the present invention to synthesize the first quadrant of a sine function.

The resulting waveform C of Fig. 2 appearing across capacitor 33 may be readily understood by considering that each of the sawtooths is successively produced by the application of a discretely different charging potential to the R-C combination of resistor 34 and capacitor 33. The amplitude modulated sequence of sawtooths represented by waveform C of Fig. 2 is coupled by cathode follower 43 to push-pull deflection amplifier 44 in turn energizing the vertical deflection plates of cathode ray tube 45. In this manner, a height deflection potential is applied to cathode ray tube 45 which is employed to produce a conventional range-height target presentation.

The cosine channel of electronic sweep generator 47 is substantially identical in structure and in operation with that of the previously described sine channel. The only difference is that which is necessary to produce a signal at cathode 46 of cathode follower 47 which is conformable in shape to the first quadrant curvature of the cosine function in contradistinction to the sine curvature of the signal appearing at cathode 35 of cathode follower 36.

In the cosine channel of electronic sweep generator 27, a sequence of lineally increasing identical sawtooths is produced across capacitor 48 in contrast to the exponentially increasing voltage signal generated across capacitor 42 of the sine channel. The linear characteristics of the sawtooths is produced primarily by increasing the time constant of resistor 59 and capacitor 48, relative to that of resistor 41 and capacitor 42 of the sine channel, as is well understood in the art. The sequence of sawtooths is coupled by cathode follower 49 and capacitor 50 to the control grid 51 of a remote cut off pentode amplifier 52.

A portion of the plate characteristics of a remote cut off pentode is such as to produce an exponentially decreasing potential at the plate thereof in response to the application to the control grid of a lineally increasing signal. Pentode amplifier 52 is quiescently biased for operation in such non-linear plate characteristic region in response to the lineally increasing sawtooth potential applied to grid 51.

It has been found that the decreasing potential at the plate of pentode 52 is substantially conformable to the first quadrant curvature of a cosine function. Thus, when the exponentially decreasing signal at the plate of pentode 52 is coupled by capacitor 53 to cathode follower 47, there appears at cathode 46 a signal for the energization of the R-C circuit formed by resistor 54 and capacitor 55 which produces across capacitor 55 the waveform illustrated in D of Fig. 2. Waveform D of Fig. 2, appearing across capacitor 55 is coupled via cathode follower 56 to push-pull deflection amplifier 57. The push-pull outputs of amplifier 57 energize the horizontal deflection plates of cathode ray tube 45 so as to provide ground range deflection potential. The video signal output of radar transceiver 18 is coupled by line 19 to the intensity modulation electrode of cathode ray tube 45.

From the preceding it can be seen that the objects of the present invention have been accomplished by the provision of an electronic sweep generator adapted to receive pulse repetition rate triggers and elevation angle synchronization triggers from a quadrant-scanning radar. The electronic sweep generator is adapted to produce at a pair of output terminals first and second amplitude modulated sequences of sawtooths, the amplitude values thereof being conformable, respectively, to the values of a sine and cosine function in the first quadrant of angular values intervening 0° and 90°. The output signals of the electronic sweep generator are applied to a cathode ray tube so as to produce a conventional range-height target presentation.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. An electronic sweep generator for use in a quadrant-scanning radar, said sweep generator comprising means for generating a control waveform substantially coextensive with the radar pulse repetition interval and having the radar pulse repetition rate, means for generating first and second energizing waveforms each having a duration substantially coextensive with the radar quadrant-scanning interval, said first energizing waveform further having a shape conformable to the curvature of a sine wave in a predetermined quadrant and said second energizing waveform further having a shape conformable to the curvature of a cosine wave in said quadrant, and first and second sawtooth generators for producing respective series of sawtooth signals in response to said energizing and control waveforms, means for applying said control waveform to each of said sawtooth generators and means for applying to each of said sawtooth generators a respective one of said energizing waveforms whereby the energized sawtooth generators produce at respective output terminals first and second amplitude modulated sequences of sawtooth signals at said radar pulse repetition rate, the amplitude modulation of each sequence of sawtooth signals being conformable to a respective one of the shapes of said energizing waveforms.

2. An electronic sweep generator for use in a quadrant-scanning radar, said radar generating first triggers at the radar pulse repetition rate and second triggers coherent with the start of each quadrant-scanning interval, said sweep generator comprising first and second pedestal generators each adapted to receive a respective one of said first and second triggers, said first pedestal generator producing a first output waveform having a duration substantially coextensive with the radar pulse repetition interval and said second pedestal generator producing a second output waveform having a duration substantially coextensive with the radar quadrant-scanning interval, first and second sawtooth generators for producing respective series of sawtooth signals in response to an energizing and a control signal, each sawtooth signal being substantially coextensive with the duration of said control signal and having an amplitude determined by that of said energizing signal, means for applying to said first and second sawtooth generators, resepectively, said first output waveform as said control signal, means responsive to said second output waveform for producing a first output signal substantially coextensive with said second output waveform and conformable to the curvature of a sine wave in a predetermined quadrant, means responsive to said second output waveform for producing a second output signal substantially coextensive with said second output waveform and conformable to the same quadrant curvature of a cosine wave, and means for applying to said first and second sawtooth generators, respectively, said first and second output signals as said energizing signals whereby the energized sawtooth generators produce at respective output terminals first and second amplitude modulated sequences of sawtooth signals at said radar pulse repetition rate, the amplitude modulation of each sequence of sawtooth signals being conformable to a respective one of the curvatures of said output signals.

3. Apparatus as defined in claim 2 wherein each of said sawtooth generators includes an energy storage device and means for discharging the energy stored in said device during the occurrence of said first output waveform and in response thereto.

4. Apparatus as defined in claim 3 wherein said energy storage device comprises a capacitor which is connected in series with a resistor to receive said energizing potential.

5. Apparatus as defined in claim 2 wherein said means for producing said first output signal comprises a resistor and capacitor connected in series circuit and adapted to receive said second output waveform, the time constant of said series circuit being relatively short with respect to the duration of said second output waveform whereby an exponentially increasing signal is produced in response to said second output waveform.

6. Apparatus as defined in claim 2 wherein said means for producing said second output signal comprises a resistor and capacitor connected in series circuit and adapted to receive said second output waveform, the time constant of said series circuit being relatively long with respect to the duration of said second output waveform, whereby a lineally increasing control signal is produced in response to said second output waveform and a remote-cut off pentode quiescently biased to operate along its non-linear plate characteristic whereat a signal conformable to a first quadrant cosine function is produced at the plate of the pentode in response to a lineally increasing signal applied to the grid of the pentode and means for applying said lineally increasing control signal to said grid.

No references cited.